(12) United States Patent
Saari et al.

(10) Patent No.: US 7,216,131 B2
(45) Date of Patent: *May 8, 2007

(54) USER-SPECIFIC PERSONALIZATION OF INFORMATION SERVICES

(75) Inventors: Timo Saari, Helsinki (FI); Sirkku Liukkonen, Helsinki (FI)

(73) Assignee: Helsingia Kauppakorkeakoulu, Helsinki (FI)

( * ) Notice: Subject to any disclaimer, the term of this patent is extended or adjusted under 35 U.S.C. 154(b) by 370 days.

This patent is subject to a terminal disclaimer.

(21) Appl. No.: 10/781,640

(22) Filed: Feb. 20, 2004

(65) Prior Publication Data

US 2004/0162856 A1 Aug. 19, 2004

Related U.S. Application Data

(63) Continuation of application No. PCT/FI02/00678, filed on Aug. 19, 2002.

(30) Foreign Application Priority Data

Aug. 20, 2001 (FI) .................................. 20011674

(51) Int. Cl.
 *G06F 17/30* (2006.01)
(52) U.S. Cl. .................... 707/104.1; 707/100; 707/101
(58) Field of Classification Search .................... None
See application file for complete search history.

(56) References Cited

U.S. PATENT DOCUMENTS

| 5,377,100 A | 12/1994 | Pope et al. |
| 5,409,445 A | 4/1995 | Rubins |
| 5,649,061 A | 7/1997 | Smyth |
| 5,754,938 A | 5/1998 | Herz et al. |

(Continued)

FOREIGN PATENT DOCUMENTS

DE 44 40 419 A1 5/1996

(Continued)

OTHER PUBLICATIONS

J.M. Serrano, M.A. Vila, V. Aranda. & G. Delgado. Using Fuzzy Relational Databases to Represent Agricultural and Environmental Information. Dept. of Computer Science & Al. University of Granada. Research Paper Mathware & Software Computing 8 (2001).*

(Continued)

*Primary Examiner*—Neveen Abel-Jalil
(74) *Attorney, Agent, or Firm*—Birch, Stewart, Kolasch & Birch, LLP (57) ABSTRACT

A method of creating metadata files for personalization of media services in an information system including a database descriptive of information content, a database descriptive of users of information services, a rulebase descriptive of reaction impulses of a test user group to information stimuli presented, a database descriptive of an information content space, and a database descriptive of a user profile space and including theoretical alternatives for parameters descriptive of users of information services. In the system, a database descriptive of reactions of users of information services is created, the database being arranged to be created as an interaction of the databases descriptive of the information content space and the user profile space. Actual parameters descriptive of the content and users of the information services are compared with theoretical parameters, and metadata files for the user and content of the information service are created as a result of the comparison.

20 Claims, 2 Drawing Sheets

U.S. PATENT DOCUMENTS

| | | | |
|---|---|---|---|
| 5,790,935 A | 8/1998 | Payton | |
| 7,003,792 B1* | 2/2006 | Yuen | 725/46 |
| 2002/0112035 A1* | 8/2002 | Carey et al. | 709/219 |
| 2002/0174182 A1* | 11/2002 | Wilkinson et al. | 709/205 |

FOREIGN PATENT DOCUMENTS

| | | |
|---|---|---|
| EP | 0 855 659 A1 | 7/1998 |
| EP | 1 065 614 A2 | 1/2001 |
| WO | WO 99/63416 | 12/1999 |
| WO | WO 00/08573 | 2/2000 |

OTHER PUBLICATIONS

Riding et al., "Cognitive styles and learning strategies: Understanding style differences in learning and behaviour," David Fulton Publishers, London, 1998, pp. 217.

Saarela et al., "Logical structure of a hypermedia newspaper," Information Processing and Management, vol. 33, No. 5, 1997, pp. 599-614.

Kahabka et al, "GRAS: An Adaptive Personalization Scheme for Hypermedia Databases," Proc. of Hypertext—Information Retrieval—Multimedia HIM, 1997, 29.9-2.10.1997, pp. 279-292.

Kurki et al., "Agents in Delivering Personalized Content Based on Semantic Metadata," Proceedings of AAAI Spring Symposium Workshop on Intelligent Agents in Cyberspace, 1999.

Anderson et al., "Personalizing Web Sites for Mobile Users," WWW10, May 1-5, 2001, Hong Kong, pp. 565-575.

Mobasher et al., "Integrating Web Usage and Content Mining for More Effective Personalization," In Proc. Of the Intl. Conf. On Ecommerce and Web Technologies (ECWeb), 2000.

* cited by examiner

USER-SPECIFIC PERSONALIZATION OF INFORMATION SERVICES

This application is a continuation of copending PCT International Application No. PCT/FI02/000678 filed on Aug. 19, 2002, which designated the United States, and on which priority is claimed under 35 U.S.C. § 120, the entire contents of which are hereby incorporated by reference.

FIELD OF THE INVENTION

The invention relates to information networks and particularly to user-specific personalization of information services usable via information networks.

BACKGROUND OF THE INVENTION

During the last few years, information services used and supplied via various information networks, particularly the Internet, have increased enormously. The end users of these services are provided with information on countless different topics and sources. Most information services, for example those provided via the Internet, are 'free' to the end user, i.e. the end user does not pay anything for the use of the information service, only for the telecommunication links used and, possibly, a basic fee to an Internet service provider. However, the creation and maintenance of information services provided in information networks typically cause costs to the providers of the information services in an information network, and these costs may be covered for instance by selling advertising space in association with an information service.

The enormous amount of information available on the Internet, for example, causes difficulties in finding the right information. Each end user typically has specific interests, preferences and information needs, and to find even the most important of them on the Internet is often unreasonably difficult and time-consuming. Similarly, as regards the providers of information services, it would be wise to direct each information service to end users who are interested in that specific information. This end also serves advertisers, since the ability to direct the content of an information service more exactly to an interested end user allows an advertiser to specify target groups more exactly. Consequently, the ability to easily and rapidly find and present information in the information network to an interested end user serves the ends of both the service provider and the advertiser.

Methods have been developed for this purpose, which allow the Internet home page or another similar browser page of the end user to be personalized, i.e. the information and hyperlinks comprised by the page to be modified to conform to the end user's preferences and information needs. Such methods are disclosed in e.g. WO 00/08573, EP 1065614, EP 855659, WO 99/63416, U.S. Pat. Nos. 5,790, 935, 5,754,938 and DE 4440419.

A problem in these known methods is that they are based solely on quantitative information about the end user and the use history directed by the end user to a given information service. From the point of view of a provider of an information service, such quantitative information only indicates the type of information an end user is interested in, but not what the end user's reaction was and if the end user was satisfied with the information content presented and the way it was presented. Thus, a provider of an information service and an advertiser do not obtain sufficiently accurately modelled feedback about the way the content of an information service should be modified in order for the content of the information service to be as optimal as possible to all parties.

BRIEF DESCRIPTION OF THE INVENTION

The object of the invention is thus to provide an improved method and a device for implementing the method so as to alleviate the drawbacks in the above problems. The objects of the invention are achieved by a method and an information system, which are characterized by what is stated in the independent claims. The preferred embodiments of the invention are described in the dependent claims.

The invention is based the information system of the invention comprising an information content database for storing parameters descriptive of the content of information services, a user profile database for storing parameters descriptive of the users of information services, a rulebase for storing a test user group's reaction impulses to information stimuli presented, a database descriptive of an information content space and including theoretical alternatives for the parameters descriptive of the content of the information services, and a database descriptive of a user profile space and including theoretical alternatives for the parameters descriptive of the users of the information services. The method of the invention comprises generating a database descriptive of a reaction space and including theoretical alternatives for the parameters descriptive of the reactions of the users of the information services. The database descriptive of the reaction space is generated as an interaction of the database descriptive of the information content space and the database descriptive of the user profile space, the interaction being specified based on the reaction impulses defined in the rulebase.

The actual parameters descriptive of the content and the users of the information services are compared with the theoretical parameters and as a result of this comparison, metadata files are generated for users of an information service and the content of the information service based on the reaction impulses included in the rulebase.

In the method of the invention for creating relevant metadata files, said rulebase is essential. In accordance with a preferred embodiment of the invention, the rulebase can be created by presenting information objects that belong to an information content space and whose content and presentation are varied to a statistically significantly large test user group. Data are collected about the reactions of the test user group to the information objects, the data including at least measurement data determining vital functions of the test user group. Finally, the reaction impulses of the test user group to the information objects presented are stored in the rulebase by interlinking the essential parameters of the user, the information content and the reaction.

In accordance with a preferred embodiment of the invention, the relevancy of metadata files can be further improved by collecting real-time usage data about the reactions of the users of the information services to the information objects presented. These collected data are used to update the parameters of the information objects included in the user profile database and the user, information content and reaction linking relations included in the rulebase.

An advantage of the method and system of the invention is that the metadata modelling the contents of information services, the way the content is presented, and individual users can be generated in such a manner that said metadata files enable such reactions to be caused to a user, which reactions are substantial with statistical probability. Furthermore, the method of the invention enables systematic modelling of an individual user's psychological reactions to the information presented. Consequently, as far as a service provider is concerned, individual information services can be provided based on modelling a user's psychological reactions, which improves the user's satisfaction with said information service.

BRIEF DESCRIPTION OF THE FIGURES

In the following, the invention will be described in detail in connection with preferred embodiments with reference to the accompanying drawings, in which.

DETAILED DESCRIPTION OF THE INVENTION

Figure 1:
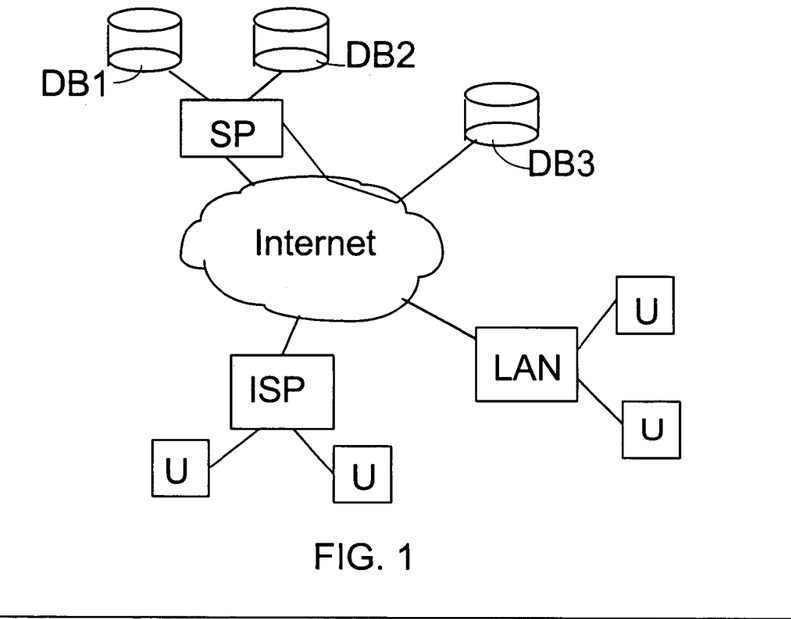
FIG. 1 shows a simplified block diagram of a prior art information system.

An example of an information system in which the method of the invention can be applied is shown with reference to FIG. 1. FIG. 1 schematically shows the Internet, to which users (U) are linked via their terminals for example via an Internet service provider (ISP) or a private local area network (LAN). A plurality of information service providers (SP) are linked to the Internet, of which FIG. 1 only shows one for the sake of clarity. An information service provider can be simply a person's home page or, at the other extreme, a large media company that provides very large amounts of information. It is preferable to store these large amounts of information in several databases (DB1, DB2), typically structured in a given manner, from which data are retrievable by means of a software application on the desired conditions. Some databases (DB3) may also be decentralized outside the service provider's information system, but said software application is, however, configured to retrieve data also in these databases. In principle, the network connecting the users and the information service provider can also be any other telecommunication network than the Internet, such as a telephone or a mobile network.

To be able to provide a user rapidly with information that interests him from this large amount of information provided by an information service provider, metadata have to be generated from the information content, i.e. information descriptive of the information content. Furthermore, to be able to adapt the information to be presented to the user in a suitable form, it is also preferable to generate information descriptive of the user, i.e. user metadata.

The method of the invention for creating metadata relevant to a user from the content of an information service is based on quantitatively measurable and qualitatively determinable parameters regarding, on the one hand, the information content, and on the other hand, the user, and on the fact that there exists a substantially determinable reaction impulse between the preset quantitative and qualitative information content and a given user profile. In other words, certain kind of people react in a given, substantially determinable manner to information presented to them, the reaction again depending on the quantitative and qualitative information content of the information to be presented.

The above substantially determinable reaction impulse is based on psychological studies, which empirically show that a psychologically significant stimulus can be used to predictably and reliably generate a given immediate and transient psychological and/or behavioural effect, the variation in said effect between different individuals being statistically predictable in relation to the variation in the stimulus. As regards reception of information, it is possible to specify, for an individual, at least an emotional effect that depends on the reactions of the autonomic and/or sympathetic/parasympathetic nervous system, a cognitive effect that depends on the efficiency of individual information processing, an experiential effect that depends on the pleasantness of the use, and effects caused by the interaction of these effects.

Variation in an effect can be determined good or bad depending on whether variation in the stimulus strengthens or weakens the effect. This reaction impulse is studied in the ATI method (Aptitude Treatment Interaction), in which different stimuli are presented to different individuals and the effect of variations in the different dimensions of the stimuli on individual effects is studied. ATI studies show that the same stimulus causes a different immediate and transient psychological and behavioural effect in different individuals, the effect being predictable substantially reliably when the properties of the stimulus relevant to create such effects are relative to individual differences, provided that said properties are adjustable with a sufficient accuracy. The ATI principle is described in detail for instance in: Riding, R. J. and Rayner, S. (1998); "*Cognitive styles and learning strategies. Understanding style differences in learning and behavior.*" David Fulton Publishers, London, which describes the use of the ATI method in computer-aided teaching.

For example, when information services are used as stimuli, justifiable relevant stimulus properties may be assumed to include at least information type and the different manners to present the information. These properties can be modified to produce different effects in a user of an information service. As to the information service provider, it is thus preferable to produce positive effects to the user of the information service in such a manner that information that interests the user is presented to him in a suitable form, whereby the user is satisfied with the service obtained and prepared to use said information service also later.

According to the ATI principle, the properties of the individual, i.e. in this case the user of the information service, the properties of the stimulus, i.e. in this case the information service, and the effects generated form an interactive variable triangle; and consequently, when two values of the variable triangle are known, the third value can be predicted. An information service provider is able to determine and modify the properties of the stimulus, i.e. the information service, in various ways. Furthermore, the information service provider is able to specify to a large degree which effects the information presented is to generate in the user. Accordingly, a solution has to be found to how the properties of the information to be presented are to be modified in order for the information to be presented to generate the desired effects in a user. In other words, it should be noted that the ATI principle provides a theoretical frame of reference to how this modification should be carried out. In the following, an information system and a method are presented for providing technical means to modify information to be presented in the desired manner.

Figure 2:
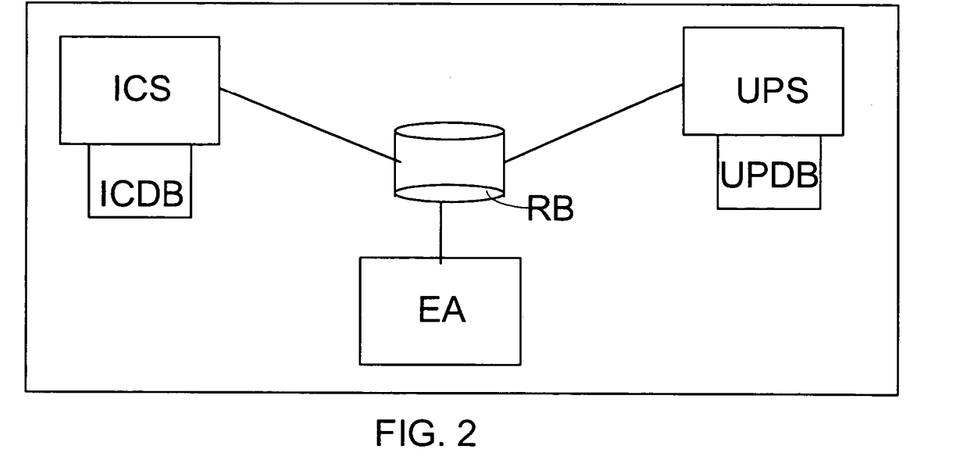
FIG. 2 shows a simplified block diagram of an information system of the invention.

The block diagram in FIG. 2 can be used to illustrate the structure of the information system of the invention. The information system comprises a database descriptive of any theoretical variation in the content of an information service or a matrix information content space ICS, which thus includes substantially all available alternatives to modify the content of the information service and the different parameters of the content. Versatile parametrization of the content of the information service to be provided is essential to the creation of relevant metadata. The content can be parametrized in various ways, but content parameters should substantially include at least some of the following categories:

content substance, which is definable quite categorically, such as 'news', which are dividable to sublevels, such as 'financial news', 'sports news', 'entertainment news', etc. In this case, parameter Substance may have n values SA (SA1 . . . n), content modality, which may be for instance text, graphics, voice, still image, video, animation or simulation. In this case, parameter Modality may have n values M (M1 . . . n), content structure, which is dividable to two parameters, i.e. content format, which specifies the visual structure of the content, such as font, location of header, use of subheads, size of viewing window, etc., and the conceptual structure of the content, which specifies for instance the size of an information block, the structural order of the information, number, length and location of overviews associated with the information etc. Parameter Format may also have n values F (F1 . . . n), and, similarly, parameter Conceptual may have n values C (C1 . . . n), other parameters descriptive of the information content and expressed by parameter Other, which may also have n values O (O1 . . . n).

The interaction between these parameters and their values constitute a multidimensional information content space descriptive of the content of the information service as a whole and is thus specifiable by matrix ICS, which is generated when the parameters and their values are multiplied by each other: ICS=(SA1 . . . n)×(M1 . . . n)×(F1 . . . n)×(C1 . . . n)×(O1 . . . n).

Another essential matter in modelling is that an end user of an information service always has a special user profile. The user profile can also be similarly parametrized in various ways, but the user profile parameters should substantially include at least some of the following categories:

implicit user profile including e.g. the user's sex, age, education, residence and other parameters IP (IP1 . . . N) implicitly describing the user. An initial implicit user profile can be created for instance by means of an inquiry in a registration form, and this user profile can be later specified as the user uses an information service over time, explicit user profile including explicit parameters EP (EP1 . . . n), which are generated on the basis of given rules or assumptions based on the parameters that implicitly specify the user and which are generated under the assumption that users of a given sex, age, education and residence stereo-typically search for certain type of information. Results of psychological tests indicative of various individual differences can also be added to this explicit user profile. These tests may be included in said registration form, for example.

information interest profile including parameters IIP (IIP1 . . . n) indicating the information categories the user is interested in. These parameters IIP may greatly correspond to the information content substance parameters SA. An information interest profile can also be preliminarily specified by means of an inquiry in the service registration form, and the information interest profile may also be later specified as the user uses an information service over time, usage history profile including history parameters HP (HP1 . . . n) specifying the user's previous uses of the information service, such as time used for browsing the information service, interval between instances of use, information categories browsed, and other quantitative parameters, collaborative filtering profile, allowing new parameters CP (CP1 . . . n) to be specified for a user for instance by combining the above profiles and then filtering according to given rules, for example information category-specifically, and other parameters descriptive of the user profile, which may also have n values OP (OP1 . . . n).

The interaction between these parameters and their values generate a multidimensional user profile space descriptive of the users of an information service as a whole and definable by matrix UPS, which forms when the parameters and their values are multiplied by each other: UPS=(IP1 . . . n)×(EP1 . . . n)×(IIP1 . . . n)×(HP1 . . . n)×(CP1 . . . n)×(OP1 . . . n). The user profile space is stored in the database UPS comprised by the information system.

The interaction of the information content space and the user profile space, i.e. multiplying matrices ICS and UPS by each other, generates generic information about the effect to be created, i.e. an effect space, which can be modelled by the matrix generated EA=ICS×UPS.

Said three matrices thus include generic information, i.e. theoretically all alternatives regarding the information service content and content variations, users and user variations, and the effects generated from the interaction of these and their variations.

A reference model, which is empirically proven good and called rulebase RB in this context, is required to determine the probabilities for the different combinations of content, users and the effects generated as their interaction from all these theoretically feasible alternatives. The rulebase RB thus specifies the above interaction, i.e. the interaction between the values of the information content space, the user profile space and the effect space. The rulebase RB thus acts as an 'algorithm' for the variable triangle, allowing the third factor to be determined when the other two factors are known.

The rulebase RB is preferably generated before the system is taken into use in such a manner that actual test users are presented different information by varying the content and presentation of the information, whereby the reactions of these test users to the information presented is measured simultaneously by different methods. Different methods can be used to measure the reactions, for instance by means of sensors coupled to the test users and measuring different vital functions, such as heart rate, electrodermal activity, blood pressure or facial muscle tension. Sensors can be coupled to different parts of the bodies of the test users, or the sensor(s) can be integrated for instance into a mouse of a computer. Methods are also known for determining the reactions of test users by means of a camera that monitors the eye movements of the user. The reactions of test users may also be determined statistically reliably by means of different interviews, questionnaires and methods based on observing the behaviour of the user. Various methods of measuring vital functions and reactions are known per se to a person skilled in the art and are disclosed for example in U.S. Pat. Nos. 5,649,061, 4,883,067, 5,377,100 and 5,409,445. The actual method used to measure the reactions of the test users is not essential to the implementation of the invention, it is more essential that the number of test users used to generate the rulebase RB is sufficient to enable the determination of statistically sufficiently accurate probabilities for the different combinations of content, users and the effects generated as their interaction. The sufficient number of test users for this purpose substantially depends on the measuring method used and may vary from less than ten to several hundreds of test users.

The information system further comprises a user profile database UPDB including information about the actual users of an information service. A user file is preferably created for each user in the database UPDB and it includes the user's profile having given parameters and user-specific values for these parameters. The parameters of the user's profile preferably include as many parameters as possible used in the determination of the user profile space UPS, i.e. implicit user profile, explicit user profile, information interest profile, use history profile, collaborative filtering profile and other parameters descriptive of the user profile. The user profile database UPDB is preferably structured as similar as possible to the user profile space UPS. In addition, information about the information the user consumes is stored in the user file: information content, specified by content parameters that preferably correspond as far as possible to the parameters used in the determination of the information content space ICS. User-specific values for all the profile and information content parameters definable for a user are stored in the user file.

These parameters and their values are updated as the parameter values change and new parameters are determined. It is thus clear that when a user starts to use an information service for the first time, the number of profile and information content parameters is still relatively low and the parameter values are not necessarily yet fixed. However, after a reasonable time of use, new parameters can be determined for the user and the parameter values specified, whereby the user profile is specified.

An initial user profile may also be determined for a user in advance for instance by means of an inquiry in a registration form. At least an initial implicit user profile and information interest profile can be generated based on the inquiry and be later specified along with the user's instances of use. The user may also be subjected to a test of a type corresponding to that of the above-described test users, allowing the reactions of the user to the different information content and information presentation to be stored in the user file.

The information system also includes an information content database ICDB including actual content objects of an information service, which may concretely be located in several different databases. The information content database ICDB is preferably structured as similar as possible to the information content space ICS.

All above databases and the information therein can be preferably structured so that the comparison and interaction of the information elements included in the databases is made as flexible as possible for the generation of the metadata required in the personalization. It is evident to a person skilled in the art that the databases can be structured in various ways, enabling the optimization of the structuring supportive of the generation of metadata to be carried out in various ways. The concrete implementation of the above databases is not either essential to the invention, allowing them to be physically suitably integrated or totally separate.

In accordance with a preferred embodiment of the invention, the information elements comprised by the information system can be coded as XML documents (Extensible Markup Language), which facilitates the structuring of the database parameters. When structured content documents are generated, the information to be collected in the content document can be arranged in accordance with a predetermined document type description DTD. The DTD determines the tags used in the XML language, the structural relations between the inter-tag elements (!ELEMENT) and other specifications used in the XML documents. As is well known in the XML language, an element starts with an initial identifier (e.g. <section>) and ends in an end identifier (</section>) and may include text or other elements. However, DTD is not necessary in valid content documents, as long as the elements to be processed are determined in the application processing the content document.

To enable further processing, the parameter values are categorized in a content document based on information elements, e.g. an element can be determined in the DTD for each information element, typically specifying several parameter values. The number of parameter values comprised by a system is usually very high, whereby several content documents are generated in the system for the different parameter entities to be monitored. Typically, parameter values are collected, XML content documents are generated/stored and compared in a workstation WS including one or more applications. The workstation WS preferably includes an XML browser application for presenting XML content documents at a user interface UI to an operator managing the system of the service provider.

The XML language cannot be used to determine the appearance of the content document (or difference document), i.e. the styles in accordance with which the content document is visible on the display of the user's or operator's workstation WS. The appearance can be specified for different terminals and workstations by using the XSL (Extended Style sheet Language). Thus, the XSL is a presentation language for XML documents and consists of two parts: modifications of XML documents and formatting dictionaries. In accordance with a preferred embodiment, the XML content document comprises a style sheet according to the XSL language for the appearance of the content document. Other style sheets may also be used, such as CSS style sheets (Cascading Style Sheet).

A style sheet may specify the manner of presentation of information in a document, such as presentation order and/or appearance. Different style sheets can be used for different information elements, their parameters and parameter values. In this case, the application modifies the data to be retrieved from databases in a form specified suitable for the user preferably by changing the XSL style sheet. In accordance with a preferred embodiment of the invention, the XSL style sheet includes instructions according to which XML-form data can be converted into the HTML format. In this case, the content document or the difference document can also be displayed in devices only having an HTML browser, which is typical when an information service is used for instance via the Internet. A content document edited according to a style sheet usually contains text, hypertext, graphic data or references to graphic data images, audio, video and other content. It may also include links to other files. As attachments to content documents, programs may be loaded to users' terminals, such as Java™ applet applications or Microsoft™ ActiveX applications, which may carry out the above processing of content documents.

As to the service provider, it is essential to the generation of useful metadata that the service provider tends to model each user in the variable triangle formed from the information to be displayed, the user and the user's reactions in order to provide the user with suitable desired effects by changing the content and presentation of the information. Typically, a service provider knows what kind of effects to preferably provide, and, on the other hand, the service provider is able to affect only the content and presentation of the information.

The metadata required in the personalization are generated by means of software, which first retrieves matrix UPS, descriptive of the user profile space, and its values from a database. The software then retrieves the profile file Profile1 concerning the user to be personalized, such as User1, from the user database UPDB, which profile is then compared with the parameters and parameter values in matrix UPS. The parameters of profile file Profile1 are placed onto the corresponding parameters in matrix UPS, and the correspondence of the parameters and their values is then studied. The file User1Metadata generated from this comparison includes information about the generic user category User1 belongs to. Since the interaction of the user profile space UPS with the information content space ICS and the effect space EA is determined based on the rulebase RB, regularities for the information content and the effects created can be derived from the file User1Metadata specifying the generic user category of User1 by means of an algorithm generated by the rulebase RB.

Similarly, the software generates a metadata structure for the content of the information service. The software first retrieves matrix ICS, descriptive of the information content space, from the database and stores it in a memory as file InformationStructure. The software then goes through the content of the information service from the content database ICDB, based on which an interpretation of the structure of the content database is made, i.e. file ContentInterpretation. This file includes information about the rules based on which the software made its interpretation, and information about the information content object category with which each particular interpretation is associated. File ContentInterpretation further includes linking addresses to the different information objects in the content database ICDB. Thus file ContentInterpretation includes as rich metadata as possible about the content of the information service, allowing it to be utilized as efficiently as possible in further processing of the information. The correspondence of the parameters and their values in the two files, InformationStructure and ContentInterpretation, is studied. A third file, AdjustedContentInformationStructure, is created from this comparison.

The above interpretations of the comparison of the content in different databases can be made for instance by using different known analysis and machine learning methods, including for instance methods based on self-organizing neural networks or what is known as the Bayes method. Any method can be used in the interpretation, provided the method allows the system to first generate a machine-language description about the different databases and then compare the descriptions of the databases with each other. The system then infers by means of for instance neural networks or the Bayes method how well these descriptions correspond to each other and generates, based on this inference, a new file including the result of the inference and usable in further processing.

The software then links, by means of the information content object link data in file ContentInterpretation, the data in file AdjustedContentInformationStructure with the content objects in the content database ICDB. From this linking a fourth file is created, ContentMetadata, which includes the data of file AdjustedContentInformationStructure and link data descriptive of the content objects of the content database ICDB, their parameters and parameter values described in file AdjustedContentInformationStructure. In other words, ContentMetadata is a file descriptive of the metadata structure of the content of the information service, in whose generation different effects caused to users are taken into account because the interaction of the information content space ICS with the user profile space UPS and the effect space EA is determined based on the rulebase RB.

In other words, the algorithm the software implements in the above comparison of the parameters and their values is based on the ATI principle such that the effect generated by the interaction between the content and its way of presentation and the user's Profile1 is determined as the basis of the algorithm, whereby this entity forms an interactive total variable stored in the rulebase RB. The algorithm is derived based on the content of the rulebase RB, whereby the algorithm serves to generate predictions based on statistical probability and based on the fact that the content and its ways of presentation, the user profile and the achieved effects form a variable triangle whose mutual reaction impulses are specified and stored in the rulebase RB. In this case, if the content of the information and its way of presentation and desired effect are known, at least some parts of the user profile can be specified. Similarly, if the user profile and the desired effect are known, a suitable information content and its way of presentation can be inferred. Further, if the user profile and information content and presentation are known, the effect achieved can be inferred.

Figure 3:
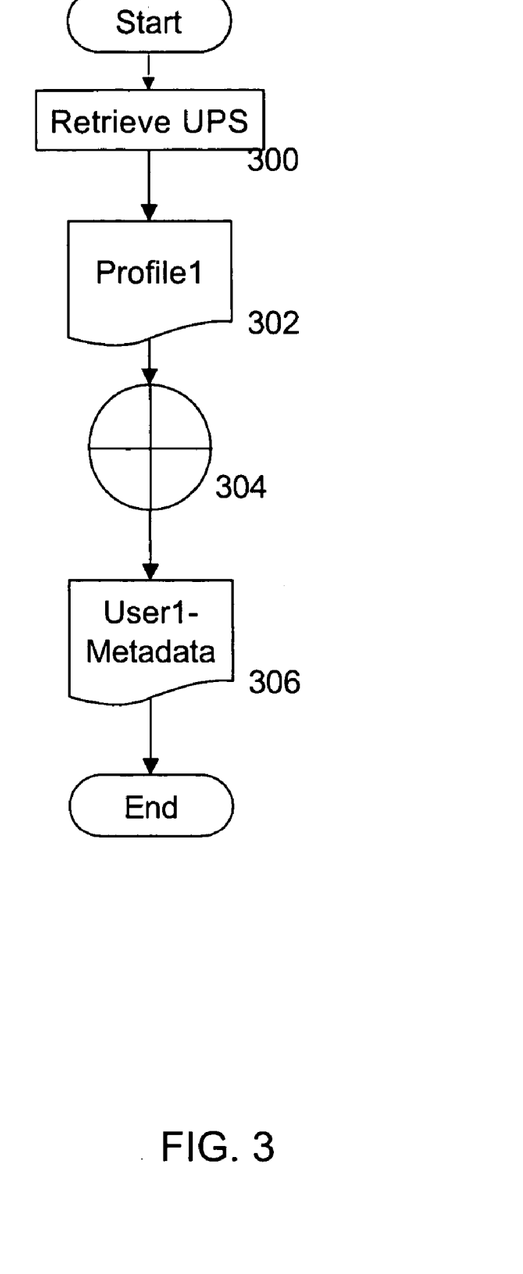
FIG. 3 is a flow diagram of creating metadata specifying a user profile.

In the following, the generation of the above metadata descriptive of a user profile by means of software is illustrated with reference to FIG. 3. First, the software retrieves matrix UPS, descriptive of the user profile space, and its values (300) from a database. The software next retrieves the profile file Profile1 (302), relating to the user User1 to be personalized, from the user database UPDB. The profile file Profile1 is compared with the matrix UPS parameters and the parameter values such that the parameters of the profile file Profile1 are placed onto the corresponding parameters in matrix UPS, whereupon a correlation (304) is determined for the parameters and their values. The parameter values may be determined for instance as predetermined numeric values, allowing different categories to be set on the correlation of the parameters according to how well the parameters correspond to each other. The correlation is used as a basis for file User1Metadata (306), which thus includes information about the generic user category to which User1 belongs. This file can then be further processed by means of an algorithm based on the rulebase RB for instance in association with modification of an information content to be provided to the user.

Figure 4:
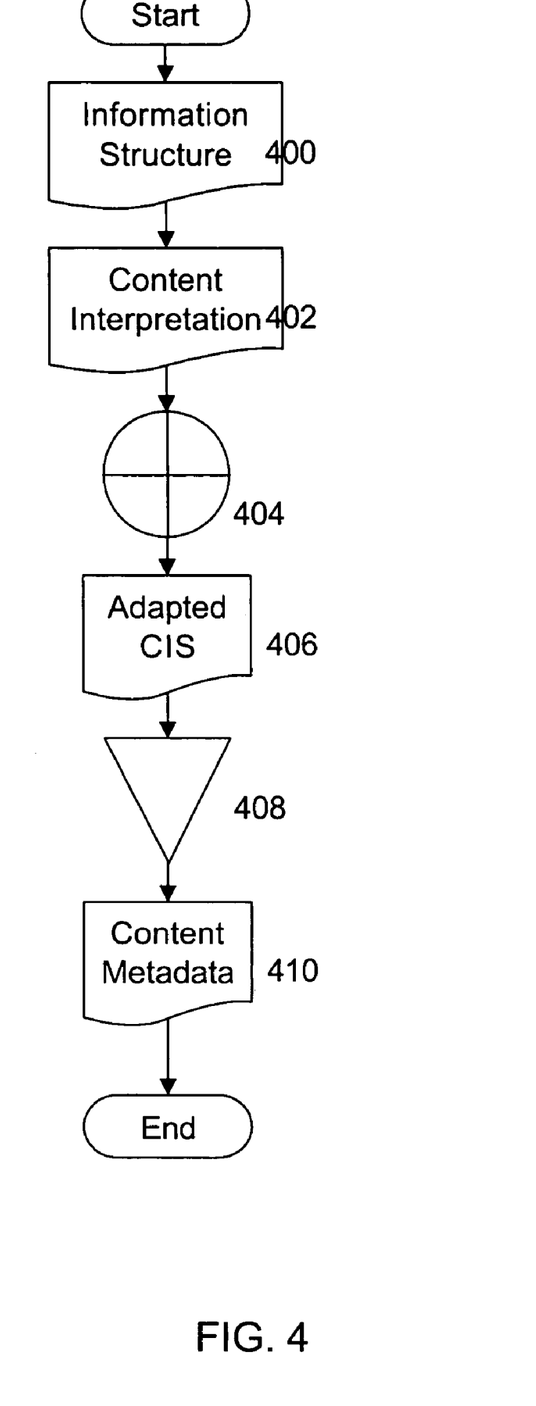
FIG. 4 is a flow diagram of creating metadata specifying the content of an information service.

The generation of the above metadata descriptive of the content of the information service by means of software is illustrated with reference to FIG. 4. First, the software retrieves matrix ICS, descriptive of the information content space, from the database and stores it in a memory as file InformationStructure (400). Next, the software scans the content database ICDB and forms an interpretation of the content of the information service and the structure of the content database, i.e. file ContentInterpretation (402). The software then determines the correlation of the parameters and their values in these two files, InformationStructure and ContentInterpretation, and a third file is created as a result, AdaptedContentInformationStructure (404). Next, the data in file AdaptedContentInformationStructure are linked to content objects (406) in content database ICDB by means of link data in the information content objects comprised by file ContentInterpretation. As a result of the linking, a fourth file is created, ContentMetadata (408), which includes the data in file AdaptedContentInformationStructure and the link data, which describe the content objects, their parameters and parameter values of the content database ICDB, which are described in file AdaptedContentInformationStructure.

Figure 5:
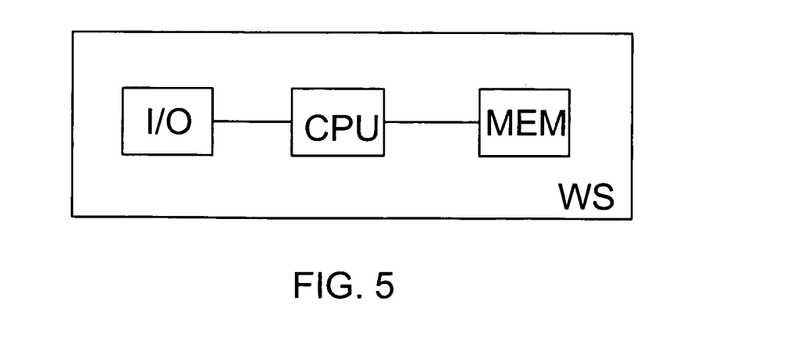
FIG. 5 is a block diagram of means used in implementing the invention.

One or more programs executed in a processor can implement the primary embodiment of the present invention. In accordance with FIG. 5, the workstation WS comprises at least one processor CPU, I/O means I/O and memory MEM for executing computer program code for implementing the functions illustrated in FIGS. 3 and 4. The computer program code can be stored in an internal memory MEM or in a separate memory means read by the computer, e.g. a diskette, a hard disk or a CD/DVD-ROM disk. Integrated circuits IC can also be used to implement the invention.

It should be noted that although an embodiment of the invention describes XML-based documents, the invention is not restricted to the use of the XML language, but content documents may be specified in the format determined by any other structural language. A proprietary solution may also be used, which does not, however, achieve the compatibility provided by the XML.

It is obvious to a person skilled in the art that as technology advances, the basic idea of the invention can be implemented in a variety of ways. The invention and its embodiments are thus not limited to the above examples, but may vary within the claims.

The invention claimed is:

1. A method comprising:
creating metadata files in personalization of media services in an information system including an information content database, in which parameters descriptive of the content of information services are arranged to be stored, and a user profile database, in which parameters descriptive of users of information services are arranged to be stored, said creating comprising:
    creating a rulebase including reaction impulses of a test user group to information services presented as stimuli;
    creating a database descriptive of an information content space and including theoretical alternatives for the parameters descriptive of the content of the information services;
    creating a database descriptive of a user profile space and including theoretical alternatives for the parameters descriptive of the users of the information services;
    creating a database descriptive of a reaction space and including theoretical alternatives for parameters descriptive of reactions of the users of the information services, the database being created as an interaction of the database descriptive of the information content space and the database descriptive of the user profile space, the interaction being specified based on the reaction impulses defined in the rulebase;
    comparing actual parameters descriptive of the content and the users of the information services with the theoretical parameters;
    creating and storing metadata files as a result of said comparison for at least one user of an information service and for at least one content of an information service based on the reaction impulses defined in the rulebase,
    creating an interpretation file from the information content database, the interpretation file including linking addresses to the different information objects in the information content database;
    comparing said interpretation file with the parameters in the information content space by placing corresponding parameters on top of each other;
    creating a correlation file as a result of said comparison; and
    deriving and storing, from said correlation file by linking addresses included in the interpretation file, a metadata file descriptive of the information objects included in an information service and the variation in content of the information objects.

2. A method, comprising:
creating metadata files in personalization of media services in an information system including an information content database, in which parameters descriptive of the content of information services are arranged to be stored, and a user profile database, in which parameters descriptive of the users of information services are arranged to be stored, said creating comprising:
    creating a rulebase including the reaction impulses of a test user group to information services presented as stimuli;
    creating a database descriptive of an information content space and including theoretical alternatives for the parameters descriptive of the content of the information services;
    creating a database descriptive of a user profile space and including theoretical alternatives for the parameters descriptive of the users of the information services;
    creating a database descriptive of a reaction space and including theoretical alternatives for parameters descriptive of reactions of the users of the information services, the database being created as an interaction of the database descriptive of the information content space and the database descriptive of the user profile space, the interaction being specified based on the reaction impulses defined in the rulebase;
    comparing actual parameters descriptive of the content and the users of the information services with the theoretical parameters; and
    creating and storing metadata files as a result of said comparison for at least one user of an information service and for at least one content of an information service based on the reaction impulses defined in the rulebase,
said method further comprising
collecting, during use of the information services by the user, data on the reactions of the users of the information services to the information objects presented;
updating the parameters of the information objects included in said user profile database based on the collected date; and
updating, based on the collected data, the rulebase linking together essential parameters of the user, information content and reaction.

3. The method of claim 2, wherein said rulebase is created by
presenting information objects, which belong to the information content space and whose content and presentation are varied, to a statistically significantly large test user group;
collecting data on the reactions of the test user group to said information objects; and storing the reaction impulses of the test user group to the presented information objects in the rulebase by linking together essential parameters of the user, the information content and the reaction.

4. The method of claim 3, wherein
said collected data specifying the reactions of the test user group includes at least some of the following:
data measured by sensors on a user's heart rate, epidennal sweating, blood pressure and/or facial muscle tension;
data determined by a camera on the user's eye movements;
data based on questionnaires, interviews or observation of behaviour.

5. The method of claim 2, wherein
said database descriptive of the information content space and the information content database include information objects that are parametrized by substantially the same parameters, which include at least some of the following: content substance, content modality, content format, conceptual structure of content.

6. The method of claim 2, wherein
said database descriptive of the user profile space and the user profile database include information objects that are parametrized by substantially the seine parameters, which include at least some of the following: implicit user profile, explicit user profile, information interest profile, use history profile, filtered profile.

7. The method of claim 2, wherein a metadata file descriptive of an individual user is created by
comparing the parameters descriptive of said user with the parameters in the user profile space by placing corresponding parameters on top of each other; and
creating, as a result of said comparison, a correlation file that specifies a user category the user belongs to.

8. The method of claim 2, further comprising
coding the information objects included in said information system as XML documents.

9. The method of claim 8, wherein said XML doewnents includes a style sheet, the style sheet including instructions converting the data included in an XML content document into an HTML document.

10. A computer-readable medium having stored thereon executable elements executable in one or more computing device, configure the processor or computer:
create a rulebase including reaction impulses of a test user group to information services presented as stimuli in a media service information system;
create an information content database descriptive of an information content space and including theoretical alternatives for the parameters descriptive of the content of the information services;
create a user profile database descriptive of a user profile space and including theoretical alternatives for the parameters descriptive of the users of the information services;
create a database descriptive of a reaction space and including theoretical alternatives for parameters descriptive of reactions of the users of the information services, the database being created as an interaction of the database descriptive of the information content space and the database descriptive of the user profile space, the interaction being specified based on the reaction impulses defined in the rulebase;
compare actual parameters descriptive of the content and the users of the information services with the theoretical parameters;
create and store metadata files as a result of said comparison for at least one user of an information service and for at least one content of an information service based on the reaction impulses defined in the rulebase;
collect, during use of the information services by the users, data on the reactions of the users of the information services to the information objects presented;
update the parameters of the information objects included in said user profile database based on the collected data; and
update, based on the collected data, the rulebase linking together essential parameters of the user, information content and reaction.

11. A computer-readable medium having stored thereon executable elements executable in one or more computing device, configure the processor or computer:
create a rulebase including reaction impulses of a test user group to information services presented as stimuli in a media service information system;
create an information content database descriptive of an information content space and including theoretical alternatives for the parameters descriptive of the content of the information services;
create a user profile database descriptive of a user profile space and including theoretical alternatives for the parameters descriptive of the users of the information services;
create a database descriptive of a reaction space and including theoretical alternatives for parameters descriptive of reactions of the users of the information services, the database being created as an interaction of the database descriptive of the information content space and the database descriptive of the user profile space, the interaction being specified based on the reaction impulses defined in the rulebase;
compare actual parameters descriptive of the content and the users of the information services with the theoretical parameters;
create and store metadata files as a result of said comparison for at least one user of an information service and for at least one content of an information service based on the reaction impulses defined in the rulebase;
create an interpretation file from the information content database, the interpretation file including linking addresses to the different information objects in the information content database;
compare said interpretation file with the parameters in the information content space by placing corresponding parameters on top of each other;
create a correlation file as a result of said comparison; and
derive and store, from said correlation file by linking addresses included in the interpretation file, a metadata file descriptive of the information objects included in an information service and the variation in content of the information objects.

12. An information system comprising:
an information content database storing parameters descriptive of a content of information services of a media service information system;
a user profile database storing parameters descriptive of users of information services are arranged to be stored;
a rulebase, in which reaction impulses of a test user group to information services presented as stimuli are arranged to be stored;
a database descriptive of an information content space and including theoretical alternatives for the parameters descriptive of the content of the information services;

a database descriptive of a user profile space and including theoretical alternatives for the parameters descriptive of the users of the information services;

a database descriptive of a reaction space and including theoretical alternatives for parameters descriptive of the reactions of the users of the information services, the database being created as an interaction of the database descriptive of the information content space and the database descriptive of the user profile space, the interaction being specified based on the reaction impulse defined in the rulebase;

actual parameters descriptive of the content and the users of the information services being arranged to be compared with the theoretical parameters;

metadata files being arranged to be created and stored as a result of said comparison for at least one user of an information service and for at least one content of an information service based on the reaction impulse defined in the rulebase;

an interpretation file being arranged to be created from the information content database, the interpretation file including linking addresses to the different information objects in the information content database;

said interpretation file being arranged to be compared with the parameters in the information content space by placing corresponding parameters on top of each other;

a correlation file being arranged to be created as a result of said comparison; and a metadata file descriptive of the information objects included in said information service and the variation in content of the information objects being arranged to be derived and stored from said correlation file by linking addresses included in the interpretation file.

13. A media service information system including:

an information content database storing parameters descriptive of a content of information services of a media service information system;

a user profile database storing parameters descriptive of the users of information services are arranged to be stored;

a rulebase, in which reaction impulses of a test user group to information services presented as stimuli are arranged to be stored;

a database descriptive of an information content space and including theoretical alternatives for the parameters descriptive of the content of the information services;

a database descriptive of a user profile space and including theoretical alternatives for the parameters descriptive of the users of the information services;

a database descriptive of a reaction space and including theoretical alternatives for parameters descriptive of the reactions of the users of the information services, the database being created as an interaction of the database descriptive of the information content space and the database descriptive of the user profile space, the interaction being specified based on the reaction impulses defined in the rulebase;

actual parameters descriptive of the content and the users of the information services being arranged to be compared with the theoretical parameters; and metadata files being arranged to be created and stored as a result of said comparison for at least one user of an information service and for at least one content of an information service based on the reaction impulses defined in the rulebase;

data are arranged to be collected on reactions of the users of the information services to the information objects presented or the information services by the user;

the parameters of the information objects included in said user profile database are arranged to be updated based on the collected data; and the rulebase linking essential parameters of the user, information content and reaction is arranged to be updated based on the collected data.

14. The media service information system of claim 13, wherein said rulebase is arranged to be created by arranging information objects, which belong to the information content space and whose content and ways of presentation are varied, to be presented to a statistically significantly large test user group;

arranging data to be collected on the reactions of the test user group to said information objects; and arranging the reaction impulses of the test user group to the presented information objects to be stored in the rulebase by linking together the essential parameters of the user, the information content and the reaction.

15. The media service information system of claim 14, wherein said data to be collected specifying the reactions of the test user group includes at least some of the following:

data measured by sensors on a user's heart rate, epidermal sweating, blood pressure and/or facial muscle tension;

data determined by a camera on the user's eye movements;

data based on questionnaires, interviews or observation of behavior.

16. The media service information system of claim 13, wherein said database descriptive of the information content space and the information content database include information objects that are parameterized by substantially the same parameters, which include at least some of the following: content substance, content modality, content format, conceptual structure of content.

17. The media service information system of claim 13, wherein said database descriptive of the user, profile space and the user profile database include information objects that are parameterized by substantially the same parameters, which include at least some of the following: implicit user profile, explicit user profile, information interest profile, use history profile, filtered profile.

18. The media service information system of claim 13, wherein a metadata file descriptive of an individual user is arranged to be created by the parameters descriptive of said user being arranged to be compared wish the parameters in the user profile space by placing corresponding parameters on top of each other; and as a result of said comparison, a correlation file that specifies user category the user belongs to is arranged to be created.

19. The media service information system of claim 13, wherein the information objects included in said information system are arranged to be coded as XML documents.

20. The media service information system of claim 19, wherein said XML documents include a style sheet, the style sheet including instructions converting the data included in an XML content document into an HTML document.

* * * * *